United States Patent
La Marca et al.

(10) Patent No.: US 10,560,285 B2
(45) Date of Patent: Feb. 11, 2020

(54) METHOD AND DEVICE FOR EVALUATING SIGNAL DATA

(71) Applicant: Robert Bosch GmbH, Stuttgart (DE)

(72) Inventors: Antonio La Marca, Leonberg (DE); Benjamin Herrmann, Ludwigsburg (DE); Claus Ritter, Waldbronn (DE); Marko Kochendoerfer, Wernau (DE); Matthias Hasert, Ludwigsburg (DE); Michael Beuten, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 15/778,912

(22) PCT Filed: Oct. 20, 2016

(86) PCT No.: PCT/EP2016/075159
§ 371 (c)(1),
(2) Date: May 24, 2018

(87) PCT Pub. No.: WO2017/089036
PCT Pub. Date: Jun. 1, 2017

(65) Prior Publication Data
US 2018/0359116 A1    Dec. 13, 2018

(30) Foreign Application Priority Data
Nov. 26, 2015   (DE) .......................... 10 2015 223 435

(51) Int. Cl.
*H04L 12/54*    (2013.01)
*H04L 12/40*    (2006.01)
*H04L 12/70*    (2013.01)

(52) U.S. Cl.
CPC ............... *H04L 12/5601* (2013.01); *H04L 2012/40273* (2013.01); *H04L 2012/5674* (2013.01)

(58) Field of Classification Search
None
See application file for complete search history.

(56) References Cited

U.S. PATENT DOCUMENTS 6,243,004 B1 *   6/2001   Flick ........................ B60R 16/03
                                                       180/287
7,171,579 B2 *   1/2007   Weigl ..................... H04J 3/0652
                                                       370/312
(Continued)

FOREIGN PATENT DOCUMENTS

DE   102013000686 A1   7/2014
EP       1315332 A2    5/2003
EP       1639758 B1    6/2013

OTHER PUBLICATIONS

International Search Report dated Dec. 21, 2016 of the corresponding International Application PCT/EP2016/075159 filed Oct. 20, 2016.

*Primary Examiner* — Bunjob Jaroenchonwanit
(74) *Attorney, Agent, or Firm* — Norton Rose Fulbright US LLP; Gerard Messina

(57) ABSTRACT

A method for evaluating signal data includes a bus signal channel supplying the signal data, a reference channel supplying reference signal values, which form the basis of the signal data, and a computer performing a signal interpretation based on an interpretable portion of the signal data and on the reference signal values, and reconstructing a signal based on the interpretation.

8 Claims, 2 Drawing Sheets

(56) References Cited

U.S. PATENT DOCUMENTS

| | | | |
|---|---|---|---|
| 7,500,151 B2 * | 3/2009 | Englert | G07C 5/008 701/33.4 |
| 7,840,735 B2 * | 11/2010 | Heller | H04L 12/40 710/104 |
| 7,979,662 B2 * | 7/2011 | Perry | G06F 11/349 711/100 |
| 7,983,250 B2 * | 7/2011 | Enders | H04L 12/40032 370/362 |
| 8,281,051 B2 * | 10/2012 | Hartwich | G05B 19/042 710/33 |
| 8,472,413 B2 * | 6/2013 | Jain | H04L 1/1854 370/336 |
| 8,855,109 B2 * | 10/2014 | Fuehrer | H04L 1/0083 370/362 |
| 2004/0044639 A1 * | 3/2004 | Schoenberg | H04L 41/069 |
| 2005/0141565 A1 * | 6/2005 | Forest | H03M 13/43 370/503 |
| 2008/0092227 A1 * | 4/2008 | Eibach | B60R 25/00 726/12 |
| 2011/0038388 A1 * | 2/2011 | Hartwich | G06F 1/12 370/503 |
| 2014/0185463 A1 * | 7/2014 | Likkei | H04L 12/40 370/250 |
| 2015/0246654 A1 * | 9/2015 | Tadic | B60W 40/09 340/436 |
| 2017/0346935 A1 * | 11/2017 | Meyfarth | H04L 67/12 |
| 2019/0054918 A1 * | 2/2019 | Lu | B60R 1/00 |

* cited by examiner

METHOD AND DEVICE FOR EVALUATING SIGNAL DATA

CROSS-REFERENCE TO RELATED APPLICATIONS

The present application is the national stage of International Pat. App. No. PCT/EP2016/075159 filed Oct. 20, 2016, and claims priority under 35 U.S.C. § 119 to DE 10 2015 223 435.5, filed in the Federal Republic of Germany on Nov. 26, 2015, the content of each of which are incorporated herein by reference in their entireties.

FIELD OF THE INVENTION

The present invention relates to a method, device, computer program, and storage medium for evaluating signal data.

BACKGROUND

In the area of data processing, a field bus is any bus system that connects field devices in a vehicle or a facility such as sensors and actuators to a control or automation unit. Typical serial field buses such as the controller area network (CAN) common in vehicle technology define at least the bit transmission layer (physical layer) and securing layer (data link layer) in a reference model in accordance with ISO/IEC 7498-1:1994.

The content of a message is generally determined in this context by an object identification (object identifier, ID). For example, in a measuring system, a separate object identifier can be assigned to each of the parameters of temperature, voltage, and pressure. A list of the object identifiers, transmitters, receivers, and the most diverse metadata are typical components of a so-called communication matrix (C matrix). This is provided, for example by the respective original equipment manufacturer (OEM), under strict constraints in a project-specific manner or requires elaborate reverse engineering (RE).

EP 1 639 758 B1 discloses in exemplary fashion a method for exchanging data in messages between at least two subscribers, which are connected by a bus system, the messages containing the data being transmitted by the subscribers via the bus system and the messages being controlled temporally by a first subscriber in such a way that the first subscriber repeatedly transmits a reference message, which contains an item of time information of the first subscriber, in at least one specifiable time interval via the bus system, the time interval being subdivided as a base cycle into time windows of specifiable length and the messages being transmitted in the time windows, a communication matrix being used in the exchange of data, which comprises at least two base cycles, a pause time of modifiable duration being provided at the end of at least one base cycle in the communication matrix, by which a temporal deviation of the start of the base cycle is corrected by adapting the duration of the pause time within the communication matrix, and a correction value being ascertained for compensating the temporal deviation, which results from a local time of a subscriber and a cycle time and which is used as a measure of the correction for compensating the pause time.

SUMMARY

An advantage of the present invention lies in that it opens a possibility of an autonomous identification and interpretation of (bus) signals for detecting communication matrices in bus systems. The provided approach is based on autonomously learning a communication on a bus system quickly and storing learned parameters, messages, and signals in an enduring and reusable manner. On this basis, the signals transmitted on the bus system can be made available to any other application.

Numerous advantages are achieved by a preferably contactless tapping of (bus) signal data and their autonomous interpretation on the part of the device of the present invention. Thus, for example, signal data are more quickly available in new vehicle projects than corresponding diagnostic data provided by the original equipment manufacturer for example. Measured signals of a vehicle can be obtained at times even without any diagnosis or vehicle manipulation by hardware (HW) or software (SW). It is then not necessary to occupy a possible interface for an on-board diagnosis (OBD). Rather, a flexible installation in the vehicle is thus possible.

A method according to the present invention does not cause vehicle irritation by continuous data access to the bus system. Rather, the provided approach allows for efficient data collection without provoking a significant vehicle reaction in driving operation. Independently of the vehicle, this approach allows for an identification of the existing vehicle topology and an autonomous reconstruction and interpretation of the signals.

In an example, a visualization interface outputs a reconstructed signal as well as a portion of the signal data that may require interpretation in order to allow for a visualization via a human-machine interface (HMI). It is thus possible to visualize the signal data from the incoming messages by an internal evaluation with the aid of ascertained metadata via an output (in real time) as (interpreted) signal values.

According to example embodiment, a signal interpretation memory builds up in a stepwise manner a communication matrix on the basis of the signal interpretation and an output interface outputs the communication matrix as needed. This example embodiment allows for preparation of rudimentary communication matrices before they are provided by the original equipment manufacturer (in a project-specific manner).

Exemplary embodiments of the present invention are illustrated in the drawings and are explained in greater detail in the following description.

DETAILED DESCRIPTION

For the purposes of the following explanations, the generic term "signal data" is understood to include any raw data of a bus message, which require interpretation since initially there is insufficient information regarding the evaluation and content of the message. Furthermore, the expression "signal value" designates a readable and/or interpretable physical measured variable. Finally, "signal interpretation" is to be understood as various metadata, e.g., a conversion formula, position and number of bytes or bits, unit, or ID, of a calculated interpretation of a signal value sought in the signal data or of such a measured variable.

Figure 1:
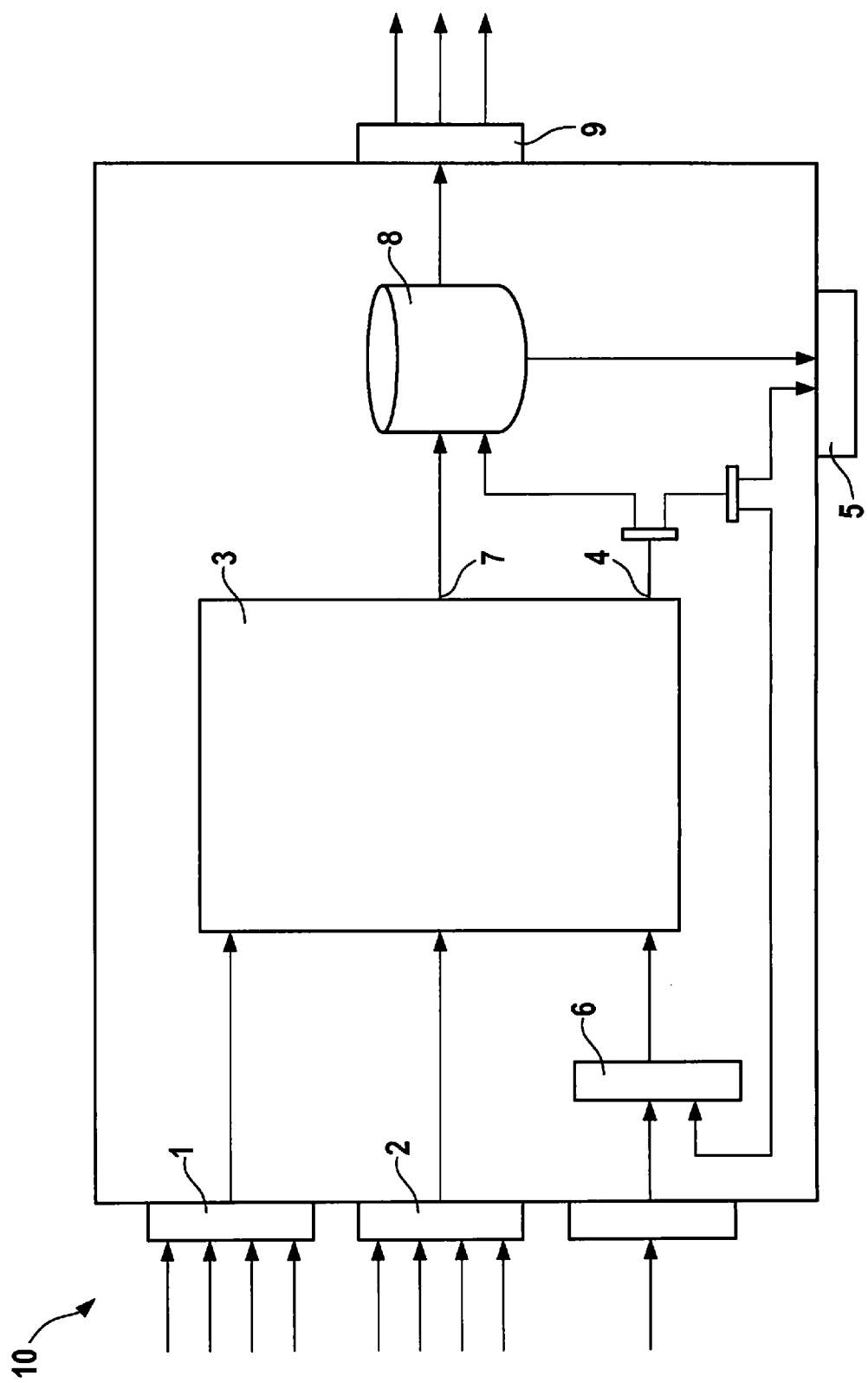
FIG. 1 schematically illustrates a device according to an example embodiment of the present invention.
Figure 2:
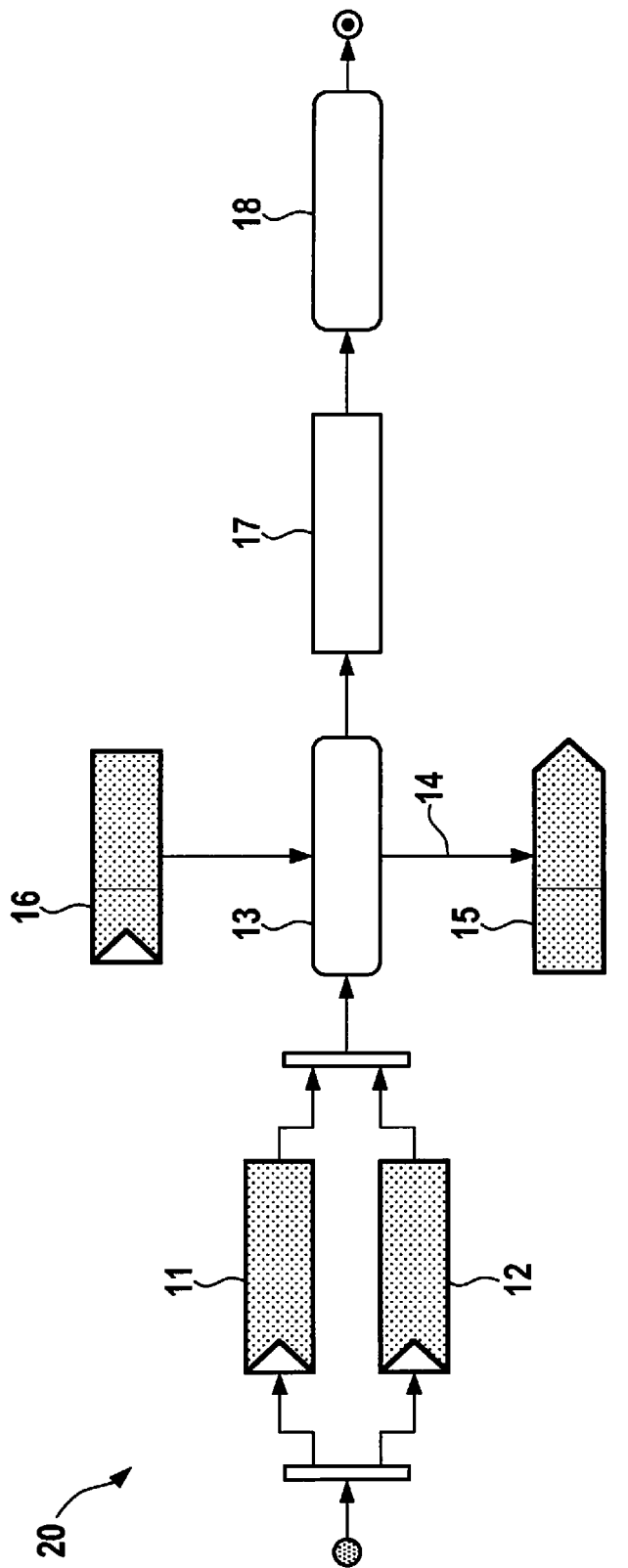
FIG. 2 is an activity diagram of a method according to an example embodiment of the present invention.

Structural aspects of the present invention are elucidated in the following with reference to the block diagram of FIG. 1, while functional aspects are primarily to be found in the representation of FIG. 2, which essentially corresponds to version 2 of the unified modeling language (UML) according to ISO/IEC 19505.

A device 10 initially receives signal data in the form of protocol data units (PDUs) on a bus protocol level from a source such as CAN, FlexRay, or LIN, which is tapped, e.g., in a contactless manner. Another possible signal source is a trace file, i.e., a previously recorded bus communication from, e.g., a vehicle, which exists as a file and which can be imported for evaluation. The initially uninterpretable signal data are supplied for computation via a bus signal channel 1 (action 11).

Device 10 receives reference signal values from a reference source such as a bus, external or internal sensor, or a further trace file. These represent sought-after measured variables, e.g., speed or rotational frequency. The reference signal values can be stimulated in the reference source inter alia by diagnostic services (OBD, OEM), interpolation (physical formula) by known data and/or signals, evaluation of existing data and/or signals from already interpretable data of known bus media or communication matrices, evaluation of external and/or internal sensors such as GPS, camera, etc. or driving instructions via an HMI—retracing a specified driving profile for example.

The reference signal values are supplied (action 12) to the algorithm via a reference channel 2.

On the basis of the available reference signal values, a computer 3 searches and ascertains the corresponding signal data and computes (action 13) autonomously a signal interpretation 7. The term "computer" is to be understood in this context in a broad sense of the word and can be implemented for example in software or hardware or in a mixed form of software and hardware. The signal interpretation 7 is made up inter alia from metadata of the searched reference signal value.

Partially interpreted signal data 4 are stored temporarily in a signal interpretation memory 8. The partially interpreted signal data 4 are supplied via a feedback channel 6 back to computer 3 and are optionally output via a visualization interface 5.

The interpretable signal values completely reconstructed by computer 3 as well as the partially interpreted signal data 4 are optionally output (object flow 14), as needed, to visualization interface 5 in order to allow for a visualization via the HMI (action 15).

The feedback channel 6 acts as an optional input of computer 3. With the aid of the feedback channel 6, computer 3 is able to evaluate a quality of a computed interpretation of a signal and perform additional computations if necessary (action 16).

The feedback channel 6 can be fed by external user feedback regarding the quality of the partially interpreted signal 4, e.g., via the HMI, and/or by internal evaluations of the partially interpreted signal 4, e.g., by evaluating a deviation or a mean error in relation to a threshold value.

The calculated signal interpretation 7 of a reconstructed signal value of a searched measured variable of the signal data detected via the bus signal channel 1 is stored in the signal interpretation memory 8 (object node 17) as the result of computer 3.

The signal interpretation memory 8 acts as an internal or external memory medium, on which the partially or completely reconstructed and interpretable signals together with the signal interpretation 7 are stored (action 18) as a communication matrix.

Signal interpretation memory 8 optionally acts as a data recorder so that it is possible to store all incoming signals from the bus signal channel 1 as well as the reference channel 2 for documentation purposes.

Via an output interface 9 of device 10, it is possible to read the built-up communication matrix from signal interpretation memory 8 and to use it for further processing or for another use.

With the aid of the optional data recorder, it is possible to read out the registered signal data and signal values of one or multiple cycles additionally as a trace.

For further processing or other usage, the interpreted signal data from the messages coming in on bus signal channel 1 can be transmitted as a signal value, which is prepared or interpreted by the internal evaluation using the metadata from signal interpretation memory 8, via the output interface 9 in real time on a (wireless or wire-conducted) communication channel (WLAN, USB or Ethernet). Alternatively or additionally, it is furthermore possible to transmit the signal data unchanged from bus signal 1 via an output interface 9 based e.g. on CAN, FlexRay, or LIN.

What is claimed is:

1. A method, the method comprising:
   supplying, via a bus signal channel, signal data;
   supplying, via a reference channel, reference signal values that form a basis of the signal data;
   interpreting the signal data by a processor, wherein based on an interpretable portion of the signal data and the reference signal values, the processor is configured to reconstruct a signal based on the interpretation;
   storing, in a memory, the interpretation of the signal data and the reconstructed signal;
   identifying, by the processor, a part of the signal data that does not include the interpretable portion;
   storing the identified part in the memory;
   obtaining, by the processor and via a feedback channel, feedback regarding the reconstructed signal; and
   evaluating, by the processor, the interpretation based on the feedback.

2. The method of claim 1, further comprising:
   storing the signal data and the reference signal values in the memory.

3. The method of claim 1, further comprising:
   outputting, via an interface, the reconstructed signal and the identified part of the signal data.

4. The method of claim 1, wherein the feedback includes a user feedback.

5. The method of claim 1, wherein the feedback includes the identified part of the signal data.

6. A method, the method comprising:
   supplying, via a bus signal channel, signal data;
   supplying, via a reference channel, reference signal values that form a basis of the signal data:
   interpreting the signal data by a processor, wherein based on an interpretable portion of the signal data and the reference signal values, the processor is configured to reconstruct a signal based on the interpretation;
   storing, in a memory, the interpretation of the signal data and the reconstructed signal;
   building up in the memory a communication matrix based on the interpretation; and
   outputting the communication matrix via an output interface.

7. A non-transitory computer-readable medium, on which are stored instructions, which are executable by a processor, comprising:
    a program code arrangement having program code for performing the following:
        obtaining signal data from a bus signal channel;
        obtaining reference signal values that form a basis of the signal data from a reference channel;
        interpreting the signal data based on an interpretable portion of the signal data and the reference signal values;
        reconstructing a signal based on the interpretation of the signal data;
        storing, in a memory, the interpretation of the signal data and the reconstructed signal;
        identifying, by the processor, a part of the signal data that does not include the interpretable portion;
        storing the identified part in the memory;
        obtaining, by the processor and via a feedback channel, feedback regarding the reconstructed signal; and
        evaluating, by the processor, the interpretation based on the feedback.

8. A device, comprising:
    a bus signal channel;
    a reference channel; and
    a processor;
    wherein the bus signal channel is configured to supply signal data to the processor,
    wherein the reference channel is configured to supply to the processor reference signal values that form a basis of the signal data, and
    wherein the processor is configured to interpret the signal data based on an interpretable portion of the signal data and the reference signal values and reconstruct a signal based on the interpretation of the signal data,
    wherein the processor is configured to identify a part of the signal data that does not include the interpretable portion, and store the identified part in the memory;
    wherein the processor and a feedback channel are configured to provide feedback regarding the reconstructed signal; and
    wherein the processor is configured to evaluate the interpretation based on the feedback.

* * * * *